United States Patent [19]

Matsuura et al.

[11] Patent Number: 4,495,334

[45] Date of Patent: Jan. 22, 1985

[54] ETHYLENE POLYMER BLEND COMPOSITIONS

[75] Inventors: Kazuo Matsuura, Tokyo; Noboru Yamaoka; Shinichi Yanahashi, both of Yokohama; Katumi Usui, Yokosuka; Mituji Miyoshi, Kanagawa, all of Japan

[73] Assignee: Nippon Oil Company Ltd., Tokyo, Japan

[21] Appl. No.: 455,472

[22] Filed: Jan. 4, 1983

Related U.S. Application Data

[63] Continuation of Ser. No. 257,647, Apr. 27, 1981, abandoned.

[30] Foreign Application Priority Data

Apr. 3, 1980 [JP] Japan .................. 55-56363

[51] Int. Cl.$^3$ .................. C08L 23/20; C08L 23/04
[52] U.S. Cl. .................. 525/240
[58] Field of Search .................. 525/240

[56] References Cited

U.S. PATENT DOCUMENTS

| | | | |
|---|---|---|---|
| 2,983,704 | 5/1961 | Roedel | 525/240 |
| 3,176,052 | 3/1965 | Peticolas | 525/240 |
| 4,330,639 | 5/1982 | Matsuura et al. | 525/240 |
| 4,335,224 | 6/1982 | Matsuura et al. | 525/240 |
| 4,337,188 | 6/1982 | Climenhage | 524/140 |
| 4,367,841 | 1/1983 | Mazumdar | 525/240 |
| 4,413,097 | 11/1983 | Matsuura et al. | 525/240 |

FOREIGN PATENT DOCUMENTS

| | | |
|---|---|---|
| 566071 | 11/1958 | Canada. |
| 815805 | 7/1959 | United Kingdom. |
| 2019412 | 10/1979 | United Kingdom. |

OTHER PUBLICATIONS

"New Materials"–Dec. 1979–p. 86, Plastics World.
"New Polyethylenes"–Feb. 80–pp. 39–40, Package Engineering.

Primary Examiner—Carman J. Seccuro
Attorney, Agent, or Firm—Austin R. Miller

[57] ABSTRACT

Provided is a polymer composition having a melt index of 0.01 to 5.0 and a density of 0.870 to 0.940 prepared by blending 30 to 80 parts by weight of an ethylene/α-olefin copolymer having an intrinsic viscosity determined in decalin at 135° C. of 1.7 to 10 dl/g and a density not higher than 0.945 which copolymer is obtained by copolymerizing ethylene with an α-olefin of $C_3$ to $C_{12}$, with 70 to 20 parts by weight of a high-pressure process polyethylene having an intrinsic viscosity determined in decalin at 135° C. of not higher than 1.3 dl/g and a density of 0.915 to 0.935.

4 Claims, No Drawings

ETHYLENE POLYMER BLEND COMPOSITIONS

This is a continuation of application Ser. No. 257,647, filed April 27, 1981, now abandoned.

BACKGROUND OF THE INVENTION

This invention relates to polymer compositions and more particularly to polymer compositions suitable for extrusion molding and blow molding.

Polyethylene has heretofore been used in a variety of uses, but when it is formed into a film by extrusion molding for example by inflation molding, the film as a commodity is required to have a certain level or higher impact strength, so that actually there is a limit to thinning the film. If the impact strength of the film can be made higher, a thinner film is employable for the same use as before and the productivity of film for ethylene polymer per unit weight is improved, thus there are great merits from the economic point of view.

In recent years, from such a standpoint there has actively been promoted development of thinner films, and a film 10–30$\mu$ thick having a fairly high impact strength is being developed. In practical use, however, the impact strength is desired to be as high as possible and a further improvement has heretofore been desired.

SUMMARY OF THE INVENTION

It is an object of this invention to provide polymer compositions suitable for extrusion molding and blow molding.

It is another object of this invention to provide polymer compositions capable of affording films or sheets superior in physical properties such as impact strength and projection strength.

It is a further object of this invention to provide polymer compositions capable of affording molded articles superior in physical properties such as resistance to environmental stress cracking.

Other objects and advantages of this invention will become apparent from the following description.

The aforesaid objects of this invention can be attained by a polymer composition suitable for extrusion molding and blow molding having a melt index of 0.01 to 5.0 and a density of 0.870 to 0.940, said polymer composition comprising a blend of (1) 30 to 80 parts by weight of an ethylene/α-olefin copolymer having an intrinsic viscosity determined in decalin at 135° C. of 1.7 to 10 dl/g and a density not higher than 0.945 which copolymer is obtained by copolymerizing ethylene with an α-olefin of $C_3$ to $C_{12}$ in a substantially liquid solvent-free vapor phase condition and in the presence of a catalyst comprising a solid substance and an organoaluminum compound which solid substance contains magnesium and titanium and/or vanadium, and (2) 70 to 20 parts by weight of a high-pressure process polyethylene having an intrinsic viscosity determined in decalin at 135° C. of not higher than 1.3 dl/g and a density of 0.915 to 0.935.

DETAILED DESCRIPTION OF THE INVENTION

The polymer composition of this invention is used suitably in the extrusion molding and blow molding for films, including thin films, sheets, pipes, electric wires, or the like. Films, sheets, or the like formed from the polymer composition of the invention are remarkably superior in impact strength and projection strength. Also, pipes, blowmolded containers, tubes, or the like, formed therefrom have an extremely high resistance to environmental stress cracking.

In the polymer composition of this invention, the copolymer of ethylene and an α-olefin of $C_3$ to $C_{12}$ used as the component (1) is obtained by copolymerizing ethylene with an α-olefin of $C_3$ to $C_{12}$ in a substantially liquid solvent-free vapor phase condition and in the presence of a catalyst comprising a solid substance and an organoaluminum compound which solid substance contains magnesium and titanium and/or vanadium. It has an intrinsic viscosity determined in decalin at 135° C. of 1.7 to 10 dl/g, preferably 2.0 to 8.5 dl/g, more preferably 2.5 to 8.0 dl/g, and a density not higher than 0.945, preferably 0.850 to 0.930. Intrinsic viscosities smaller than 1.7 dl/g are not desirable because such values would result in deterioration of the impact strength and stiffness of the resulting film. Larger intrinsic viscosities than 10 dl/g or higher densities than 0.945 are not desirable, either, because they would lead to deteriorated impact strength and moldability and easier production of gel. The high-pressure process polyethylene used as component (2) in the polymer composition of this invention has an intrinsic viscosity determined in decalin at 135° C. of not larger than 1.3 dl/g, preferably 0.2 to 1.0 dl/g, and a density of 0.915 to 0.935. Usually it is prepared by conventional means using an initiator which produces a free radical such as oxygen, hydrogen peroxide, benzoyl peroxide, t-butyl peroxide and lauroyl peroxide at a temperature of 100° to 350° C. and at a pressure of 500 to 4000 kg/cm$^2$, provided that it should satisfy the above-mentioned requirements of intrinsic viscosity and density. The high-pressure process polyethylene used as component (2) in the polymer composition of this invention includes not only a homopolymer of ethylene but also copolymers of ethylene and small amounts of other polymerizable monomers such as, for example, vinyl and acrylic esters, or mixtures thereof.

In the polymer composition of this invention, the blending ratio (in parts by weight) between the ethylene/$C_{3-12}$ α-olefin copolymer as component (1) and the high-pressure process polyethylene as component (2) is, in terms of component (1) : component (2), 30 to 80 : 70 to 20, preferably 35 to 75 : 65 to 25 and more preferably 40 to 70 : 60 to 30. There is no special limit to the manner in which both are blended; that is, any conventional methods may be used.

The polymer composition of this invention obtained by blending the components (1) and (2) is desired to have a melt index of 0.01 to 5.0 and a density of 0.870 to 0.940, preferably 0.880 to 0.935. Higher densities than 0.940 are not desirable because of deterioration in impact strength of the resulting film. Lower densities than 0.870 are not desirable, either, in practical use because the resulting film would become extremely soft and sticky and cause blocking.

The ethylene/α-olefin copolymer having an intrinsic viscosity determined in decalin at 135° C. of 1.7 to 10 dl/g and a density not higher than 0.945, used as component (1) in the polymer composition of this invention, is essentially prepared, as previously described, by copolymerizing ethylene with a α-olefin of $C_3$ to $C_{12}$ in a substantially liquid solvent-free vapor phase condition and in the presence of a catalyst comprising a solid substance and an organoaluminum compound which solid substance contains magnesium and titanium and-/or vanadium. The preparation method for the ethylene/α-olefin copolymer as the component (1) is here described more in detail.

The catalyst system used comprises the combination of a solid substance and an organoaluminum compound which solid substance contains magnesium and titanium and/or vanadium. Any known catalysts comprising such a combination may be used without any trouble. As the said solid substance are mentioned for example titanium compounds and/or vanadium compounds by known methods to inorganic solid carriers containing magnesium; examples of inorganic solid carriers containing magnesium are metal magnesium, magnesium hydroxide, magnesium carbonate, magnesium oxide, magnesium chloride, further double salts, double oxides, carbonates, chlorides and hydroxides containing magnesium atom and a metal selected from the group consisting of silicon, aluminum and calcium, and those inorganic solid carriers after treatment or reaction with an oxygen-containing compound, a sulfur-containing compound, an aromatic hydrocarbon or a halogen-containing substance.

By way of illustrating the aforesaid oxygen-containing compound, mention may be made of water, organic oxygen-containing compounds such as alcohols, phenols, ketones, aldehydes, carboxylic acids, esters and acid amides, and inorganic oxygen-containing compounds such as metal alkoxides and oxychlorides of metals. As the sulfur-containing compound mention may be made of organic sulfur-containing compounds such as thiols and thioethers, and inorganic sulfur-containing compounds such as sulfur dioxide, sulfur trioxide and sulfuric acid. As the aromatic hydrocarbon may be mentioned a variety of mono- and polycyclic aromatic hydrocarbons such as benzene, toluene, xylene, anthracene and phenanthrene. Examples of the halogen-containing substance are chlorine, hydrogen chloride, metal chlorides and organic halides.

By way of illustrating the titanium compound and/or vanadium compound, mention may be made of halides, alkoxyhalides, alkoxides and halogenated oxides of titanium and/or vanadium. Suitable examples of the titanium compound are tetravalent and trivalent titanium compounds. As tetravalent titanium compounds are preferred those represented by the general formula $Ti(OR)_nX_{4-n}$ wherein R is a $C_1$ to $C_{20}$ alkyl, aryl or aralkyl, X is halogen and n is $0 \leq n \leq 4$ such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium. As trivalent titanium compounds are mentioned titanium trihalides obtained by reducing titanium tetrahalides such as titanium tetrachloride and titanium tetrabromide with hydrogen, aluminum, titanium or an organometallic compound of Group I-III metals in the Periodic Table, and also trivalent titanium compounds obtained by reducing tetravalent alkoxytitanium halides presented by the general formula $Ti(OR)_mX_{4-m}$ with an organometallic compound of Group I-III metals in the Periodic Table in which the formula R is a $C_1$ to $C_{20}$ alkyl, aryl or aralkyl, X is halogen and m is $0 < m < 4$. Examples of the vanadium compound are tetravalent vanadium compounds such as vanadium tetrachloride, vanadium tetrabromide and vanadium tetraiodide, pentavalent vanadium compounds such as vanadium oxytrichloride and orthoalkyl vanadate, and trivalent vanadium compounds such as vanadium trichloride and vanadium triethoxide.

Among the above-exemplified titanium compounds and vanadium compound, tetravalent titanium compounds are particularly preferred.

Preferred examples of the catalyst system used are combinations of organoaluminum compounds with the following solid substances (in the following formulae R represents an organic radical and X a halogen atom): $MgO-RX-TiCl_4$ system (see Japanese Patent Publication No. 3514/1976), $Mg-SiCl_4-ROH-TiCl_4$ system (see Japanese Patent Publication No. 23864/1975), $MgCl_2-Al(OR)_3-TiCl_4$ system (see Japanese Patent Publication Nos. 152/1976 and 15111/1977), $MgCl_2-SiCl_4-ROH-TiCl_4$ system (see Japanese Patent Laying Open Print No. 106581/1974), $Mg(OOCR)_2-Al(OR)_3-TiCl_4$ system (see Japanese Patent Publication No. 11710/1977), $Mg-POCl_3-TiCl_4$ system (see Japanese Patent Publication No. 153/1976), $MgCl_2-AlOCl-TiCl_4$ system (see Japanese Patent Publication No. 15316/1979). But the catalysts which may be used in the invention are not restricted to those just exemplified above.

By way of illustrating another catalyst system which may be used in the invention, mention may be made of the combination of an organoaluminum compound with the reaction product of an organomagnesium compound, e.g. so-called Grignard compounds, and a titanium compound and/or a vanadium compound as the solid substance. As examples of the organomagnesium compounds are mentioned those represented by the general formulae $RMgX$, $R_2Mg$ and $RMg(OR)$ wherein R is an organic radical of $C_1$ to $C_{20}$ and X is halogen, and ether complexes thereof, as well as those organomagnesium compounds after modification with various other organometallic compounds such as organosodium, organolithium, organopotassium, organoboron, organocalcium and organozinc.

As concrete examples of such catalyst system mention may be made of the combination of an organoaluminum compound with such solid substances as $RMgX-TiCl_4$ system (see Japanese Patent Publication No. 39470/1975), $RMgX$-phenol-$TiCl_4$ system (see Japanese Patent Publication No. 12953/1979) and $RMgX$-halogenated phenol-$TiCl_4$ system (see Japanese Patent Publication No. 12954/1979).

In the catalyst system used in the invention as exemplified above, the titanium compound and/or vanadium compound may be used as the addition product with an organocarboxylic acid ester, and the solid carrier consisting of a magnesium-containing inorganic compound may be contacted in advance with an organocarboxylic acid ester. Further, the organoaluminum compound may be used as the addition product with an organocarboxylic acid ester. In all possible cases, moreover, the catalyst system used in the invention may be prepared in the presence of an organocarboxylic acid ester.

As the organocarboxylic acid ester there may be used various aliphatic, alicyclic and aromatic carboxylic acid esters, preferably aromatic carboxylic acids of $C_7$ to $C_{12}$; for example, there may be used alkyl esters such as methyl and ethyl of benzoic, anisic and toluic acids.

Preferred examples of the organoaluminum compound to be combined with the foregoing solid substance are those represented by the general formulae $R_3Al$, $R_2AlX$, $RAlX_2$, $R_2AlOR$, $RAl(OR)X$ and $R_3Al_2X_3$ wherein R, which may be alike or different, is a $C_1$ to $C_{20}$ alkyl, aryl or aralkyl and X is halogen, such as triethylaluminum, triisobutylaluminum, trihexylaluminum, trioctylaluminum, diethylaluminum chloride, ethylaluminum sesquichloride, and mixtures thereof.

The amount of the organoaluminum compound to be used is not specially limited, but usually it may be used in an amount of 0.1 to 1000 moles per mole of the transition metal compound.

The catalyst system used in the invention may be contacted with an α-olefin before its use in the vapor phase polymerization, whereby its polymerization activity can be improved to a great extent and the operation can be performed more stably than when it is not so treated. In this case, various α-olefins may be employed, preferably those of $C_3$ to $C_{12}$ and more preferably those of $C_3$ to $C_8$, for example, propylene, butene-1, pentene-1, 4-methylpentene-1, heptene-1, hexene-1, octene-1, decene-1, dodecene-1, and mixtures thereof. The temperature and duration of contact between the catalyst system and an α-olefin can be chosen over a wide range, for example, both may be contacted together at a temperature of 0° to 200° C., preferably 0° to 110° C., for 1 minute to 24 hours. The amount of an α-olefin to be contacted with the catalyst system also can be chosen over a wide range, but usually it is desired to treat the catalyst system with an α-olefin in an amount of 1 g. to 50,000 g., preferably 5 g. to 30,000 g., per gram of the solid substance to allow 1 g. to 500 g. of the α-olefin to be reacted per gram of the solid substance. Both may be contacted at any pressure, but desirable pressures range from −1 to 100 kg/cm².G.

In treating the catalyst system with an α-olefin, the organoaluminum compound used may be combined in its entire amount with the solid substance and thereafter contacted with the α-olefin. Alternatively, the organoaluminum compound may be combined partially with the solid substance and then contacted with a gaseous α-olefin, while remaining organoaluminum compound may be separately added in the vapor phase polymerization. During the contact between the catalyst system and an α-olefin there may be present hydrogen gas or other inert gases such as nitrogen, argon and helium.

The component (1) used in the invention essentially comprises a copolymer having predetermined intrinsic viscosity and density obtained by copolymerizing ethylene and an α-olefin in vapor phase and in the presence of the foregoing catalyst comprising a solid substance and an organoaluminum compound which solid substance contains magnesium and a titanium compound and/or a vanadium compound. As the α-olefin used in the copolymerization reaction there may be mentioned those of $C_3$ to $C_{12}$, for example, propylene, butene-1, pentene-1, 4-methylpentene-1, heptene-1, hexene-1, octene-1, decene-1, and dodecene-1.

The polymerization reaction is carried out in a substantially liquid solvent-free vapor phase condition, and known reactors may be used, including fluidized bed and agitation vessel.

Polymerization conditions include temperatures ranging usually from 0° to 110° C., preferably from 20° to 80° C., and pressures from atmospheric pressure to 70 kg/cm².G, preferably from 2 to 60 kg/cm².G. The molecular weight can be adjusted by changing the polymerization temperature, the catalyst molar ratio or the amount of comonomer, but the addition of hydrogen into the polymerization system is more effective for this purpose. Of course, there may be performed one or more stage polymerization reactions involving different polymerization conditions such as different hydrogen and comonomer concentrations and different polymerization temperatures.

The polymer composition of this invention is obtained by blending the so-prepared components (1) and (2) in a predetermined ratio. But according to purposes of use, it may be modified as necessary by incorporating therein suitable amounts of known polymers or organic and inorganic additives such as high-pressure process polyethylene having other properties, high density polyethylene, low-pressure process medium and low density polyethylene, polypropylene, polybutene, poly-4-methylpentene-1, ethylene-vinyl acetate copolymer, ethylene-ethyl acrylate copolymer, and petroleum resins.

The polymer composition of this invention prepared as above exhibits remarkable effects particularly in extrusion molding and blow molding. For example, when it is formed into a thin film by extrusion molding, the film thereby obtained has a high impact strength so its utility value is greatly enhanced.

Working examples of this invention are given below, but it is to be understood that they are for illustration to work the invention and are not intended to limit the invention.

EXAMPLE 1

1000 g. of substantial anhydrous magnesium chloride, 50 g. of 1,2-dichloroethane and 170 g. of titanium tetrachloride were ball-milled for 16 hours at room temperature under a nitrogen atmosphere to allow the titanium compound to be supported on the carrier. The resulting solid substance contained 35 mg. of titanium per gram thereof.

As an apparatus for the vapor phase polymerization there was used a stainless steel autoclave, and with a blower, a flow rate adjusting valve and a dry cyclone for separating the resulting polymer being provided to form a loop. Temperature control for the autoclave was effected by passing warm water through the jacket.

The polymerization temperature was set at 60° C. Into the autoclave were fed the above solid substance at a rate of 250 mg/hr and triethylaluminum at a rate of 50 mmol/hr, and polymerization was made while adjusting so that the composition (mole ratio) of ethylene and that of butene-1 contained in the gas fed to the autoclave by the blower were 71% and 29%, respectively.

The resulting ethylene/butene-1 copolymer had an intrinsic viscosity determined in decalin at 135° C. of 3.5 dl/g, a bulk density of 0.39 and a density of 0.897.

50 parts by weight of the ethylene/butene-1 copolymer was thoroughly blended with 50 parts by weight of a high-pressure process polyethylene having an intrinsic viscosity determined in decalin at 135° C. of 0.6 dl/g and a density of 0.918 then the blend was formed into pellets at 200° C. using an extruder with an inside diameter of 50 mm and a L/D ratio of the screw of 26. The melt index and density of the pellets were 0.10 and 0.910, respectively.

The pellets were melt-extruded through a spiral annular die with a die lip clearance (die gap) of 1.0 mm and a die lip outside diameter of 100 mm attached to the extruder, and formed into a film 30μ thick by air-cooled inflation. The film forming conditions involved a die temperature of 220° C. and a blow-up ratio of 3.1. The film, having a dart impact of 554 g. (determined according to ASTM D 1709-62T), proved to have an extremely high impact strength.

EXAMPLE 2

45 parts by weight of an ethylene/butene-1 copolymer having an intrinsic viscosity determined in decalin at 135° C. of 4.5 dl/g and a density of 0.903 which had been prepared in the same manner as in Example 1 was thoroughly blended with 55 parts by weight of a high-pressure process polyethylene having an intrinsic viscosity of 0.7 dl/g and a density of 0.920, then the blend was formed into pellets at 200° C. by means of an extruder having an inside diameter of 30 mm and a L/D ratio of the screw of 26. The melt index and density of the pellets were 0.05 and 0.910, respectively.

The pellets were formed into a film 30μ thick in the same manner as in Example 1, which film, having a dart impact of 490 g., proved to have an extremely high impact strength.

EXAMPLE 3

47 parts by weight of an ethylene/butene-1 copolymer having an intrinsic viscosity determined in decalin at 135° C. of 3.9 dl/g and a density of 0.894 which had been prepared in the same manner as in Example 1 was thoroughly blended with 53 parts by weight of a high-pressure process polyethylene having an intrinsic viscosity of 0.8 dl/g and a density of 0.923, then the blend was formed into pellets at 200° C. by means of an extruder having an inside diameter of 50 mm and a L/D ratio of the screw of 26. The melt index and density of the pellets were 0.09 and 0.911, respectively.

The pellets were formed into a film 30μ thick in the same manner as in Example 1, which film, having a dart impact of 510 g., proved to have an extremely high impact strength.

EXAMPLE 4

55 parts by weight of an ethylene/propylene copolymer having an intrinsic viscosity determined in decalin at 135° C. of 4.0 dl/g and a density of 0.888 which had been prepared in the same manner as in Example 1 was thoroughly blended with 45 parts by weight of a high-pressure process polyethylene having an intrinsic viscosity of 0.6 dl/g and a density of 0.918, then the blend was formed into pellets at 200° C. by means of an extruder having an inside diameter of 50 mm and a L/D ratio of the screw of 26. The melt index and density of the pellets were 0.07 and 0.903, respectively.

The pellets were formed into a film 30μ thick in the same manner as in Example 1, which film, having a dart impact of 320 g., proved to have an extremely high impact strength.

EXAMPLE 5

60 parts by weight of an ethylene/butene-1 copolymer having an intrinsic viscosity determined in decalin at 135° C. of 2.8 dl/g and a density of 0.926 which had been prepared in the same manner as in Example 1 was thoroughly blended with 40 parts by weight of a high-pressure process polyethylene having an intrinsic viscosity of 0.8 dl/g and a density of 0.920, then the blend was formed into pellets at 200° C. by means of an extruder having an inside diameter of 50 mm and a L/D ratio of the screw of 26. The melt index and density of the pellets were 0.25 and 0.924, respectively.

The pellets were formed into a film 30μ thick in the same manner as in Example 1, which film, having a dart impact of 340 g., proved to have an extremely high impact strength.

What is claimed is:

1. A polymer composition having a melt index of 0.01 to 5.0 and a density of 0.880 to 0.935, said polymer composition comprising a blend of:
    (1) 40 to 70 parts by weight of an ethylene/α-olefin copolymer having an intrinsic viscosity determined in decalin at 135° C. in the range of from 3.5 to 8.0 dl/g and a density in the range of from 0.850 to 0.903 which copolymer is obtained by copolymerizing ethylene with an α-olefin having 4 to 12 carbon atoms in a substantially liquid solvent-free vapor phase condition and in the presence of a catalyst comprising a solid ganoaluminum compound, said solid substance containing magnesium and titanium and/or vanadium, and
    (2) 60 to 30 parts by weight of a high-pressure process polyethylene having an intrinsic viscosity determined in decalin at 135° C. of not higher than 1.3 dl/g and a density of 0.915 to 0.935.

2. The composition as defined in claim 1, in which said ethylene/α-olefin copolymer (1) is obtained by the vapor phase polymerization using said catalyst, said catalyst being treated with an α-olefin in advance of the vapor phase polymerization.

3. The composition as defined in claim 1, in which the intrinsic viscosity of said high-pressure process polyethylene (2) determined in decalin at 135° C. is in the range of from 0.2 to 1.0 dl/g.

4. A film formed from the composition as defined in claim 1, 2, or 3.

* * * * *